March 30, 1937.   H. J. KNERR   2,075,042
TRANSPORT CARGO AIRCRAFT
Filed May 8, 1935   3 Sheets-Sheet 1
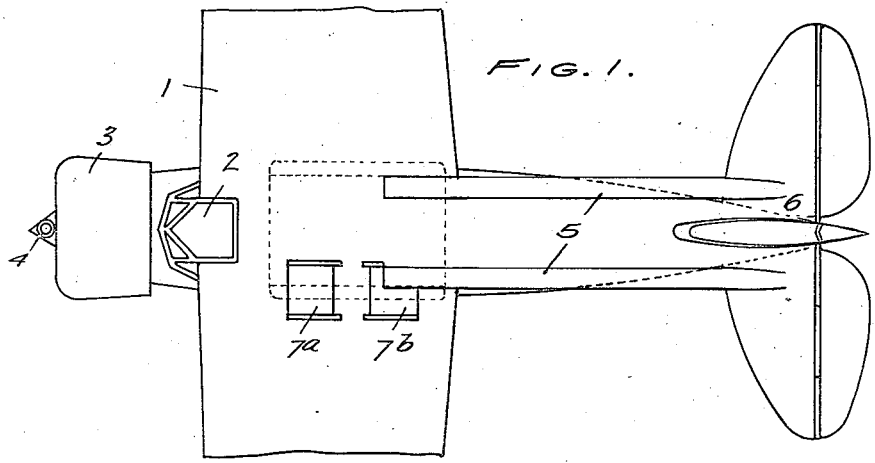
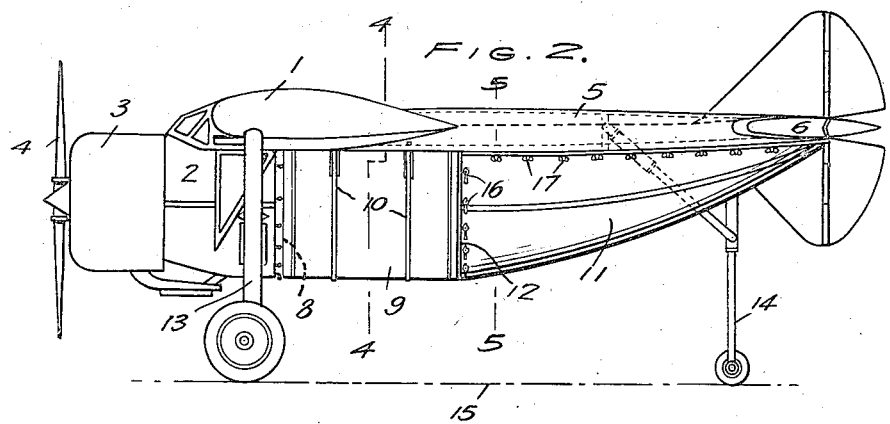
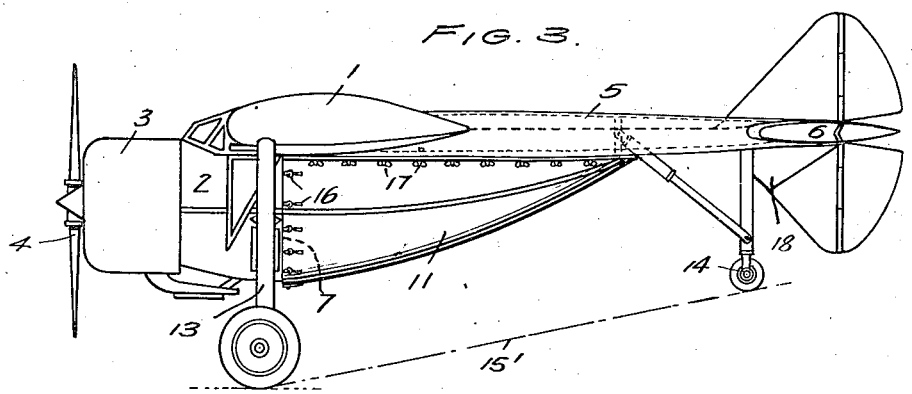
INVENTOR
HUGH J. KNERR
ATTORNEYS March 30, 1937.  H. J. KNERR  2,075,042
TRANSPORT CARGO AIRCRAFT
Filed May 8, 1935   3 Sheets-Sheet 2
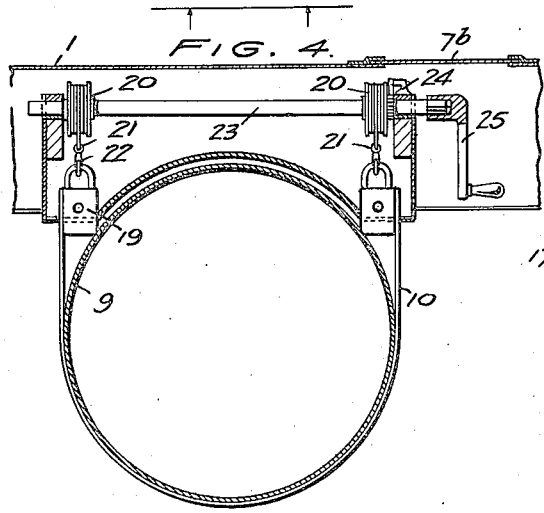
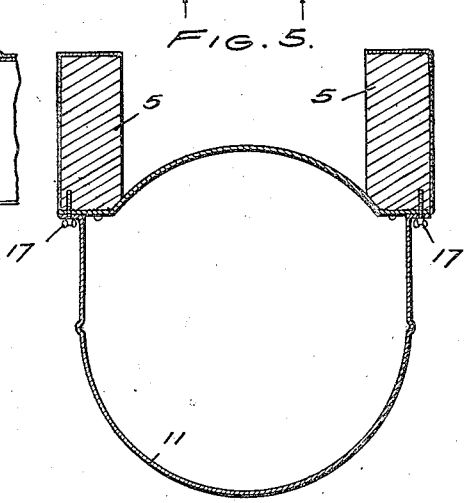
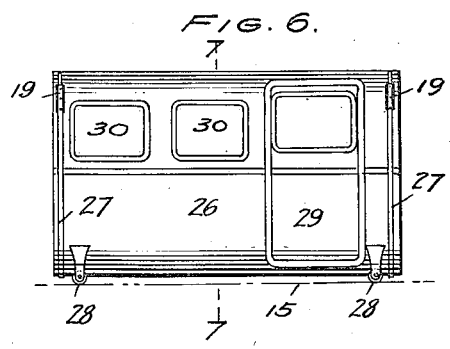
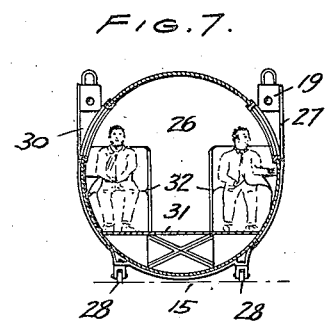
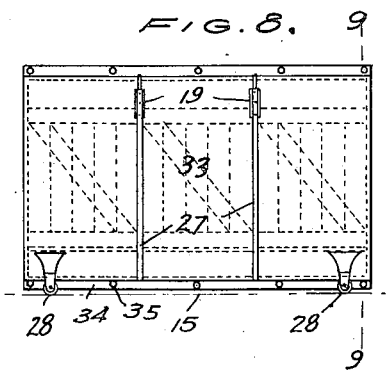
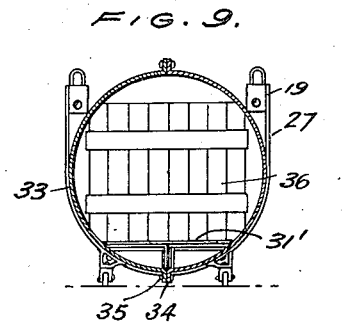
INVENTOR
HUGH J. KNERR
BY *Francis H. Vanderwerker*
and *Ubade Koontz*
ATTORNEYS

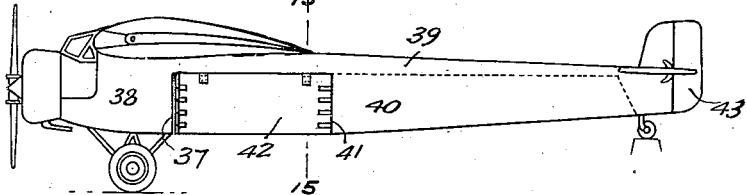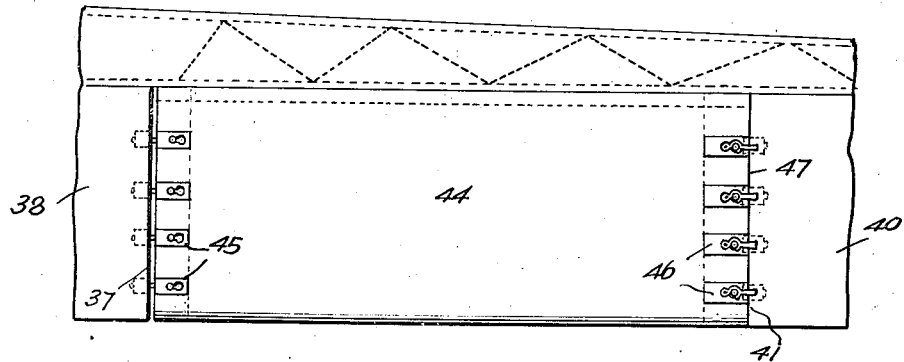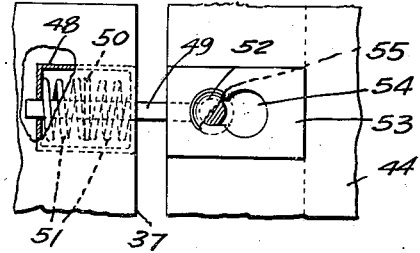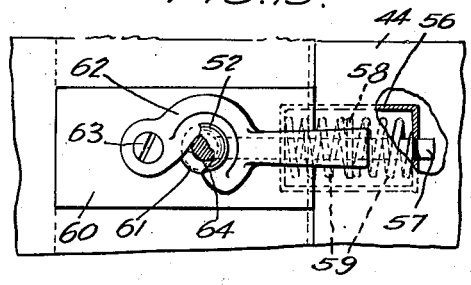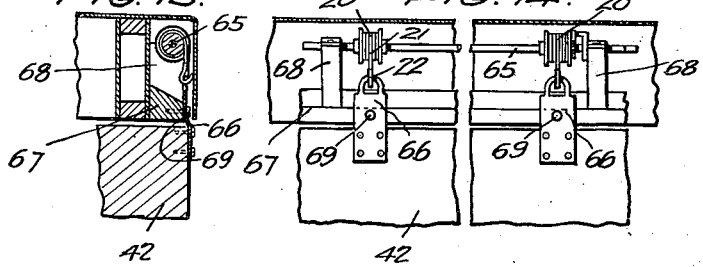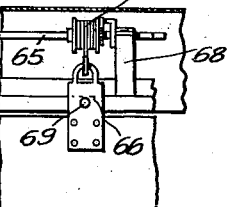

Patented Mar. 30, 1937

2,075,042

UNITED STATES PATENT OFFICE 2,075,042

TRANSPORT CARGO AIRCRAFT

Hugh J. Knerr, Langley Field, Va.

Application May 8, 1935, Serial No. 20,399

5 Claims. (Cl. 244—118)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to aircraft adapted to the transportation of passengers or cargo interchangeably.

It is another object of my invention to employ standardized containers, each container being in the nature of a vehicle compartment with or without wheels as each special usage may dictate.

When applied to an airplane, it is a further object of my invention to provide leveling means for the fuselage proper and hoisting means contained within said fuselage for raising and securing the aforesaid vehicle compartments.

During the aforesaid application, it is a still further object of my invention to provide a longitudinally adjustable fairing continuation of the pilot's cabin in order that the airplane may be operated with or without vehicle compartment.

With the foregoing and other objects in view, which will appear as the description proceeds, the invention consists of certain new and novel improvements in transport-cargo aircraft, which will be hereinafter more fully illustrated and described in the accompanying drawings and more particularly pointed out in the appended claims.

Referring to the drawings, in which numerals of like character designate similar parts throughout the several claims:

Fig. 1 is a plan view of an airplane incorporating my invention.

Fig. 2 is a side elevation of the airplane shown in Fig. 1.

Fig. 3 is similar to Fig. 1, except that the airplane is without vehicle compartment.

Fig. 4 is a cross-sectional view taken on the line 4—4 of Fig. 2.

Fig. 5 is a cross-sectional view taken on the line 5—5 of Fig. 2.

Fig. 6 is a side elevation of a vehicle compartment adapted for passenger carrying.

Fig. 7 is a cross-sectional view taken on the line 7—7 of Fig. 6.

Fig. 8 is a side elevation of a vehicle compartment adapted for freight carrying.

Fig. 9 is a cross-sectional view taken on the line 9—9 of Fig. 8.

Fig. 10 is a side elevation of a further embodiment of my invention.

Fig. 11 is an enlarged portion of Fig. 10.

Fig. 12 shows a locking mechanism.

Fig. 13 shows a second mechanism cooperating with the mechanism of Fig. 12.

Fig. 14 shows a hoist employed in Fig. 10.

Fig. 15 is a cross-sectional view taken on the line 15—15 of Fig. 10.

In Fig. 1 there are shown in plan the central portion of a wing panel 1, a pilot's cabin 2 located beneath the leading edge thereof, and an engine cowling 3 and propeller 4 secured to the forward extremity of the cabin 2. Two outrigger beams 5 project aft, from the cabin 2, to emerge forward of the trailing edge of the panel 1 and extend rearwardly thereof to terminate in and become part of the stabilizer portion of tail surfaces 6. The panel 1 is provided with sliding panels 7a and 7b for effecting ingress into the wing interior.

Fig. 2 shows the side elevation of the panel 1, cabin 2, cowling 3, propeller 4, beams 5 and tail surfaces 6. It will be noted that the airplane is devoid of load carrying structure rearward of aft wall 8 of the cabin 2 and beneath the bottom sills of the beams 5. A vehicle compartment 9 suited to the transportation of gases, liquids or solids is secured to the beams 5 by means of retaining straps 10. A fairing 11 is secured to aft wall 12 of the compartment 9 and to the bottom sills of the beams 5. The airplane is further provided with a landing gear 13 and an extended tail wheel 14. It will be noted that the tail wheel 14 has been fully extended in order that the longitudinal axes of the beams 5 may be maintained parallel to ground line 15 such that the compartment 9 may be readily hoisted into the position shown in Fig. 2.

In Fig. 3 the tail wheel 14 has been retracted such that in a state of rest the beams 5 are angularly disposed with reference to ground line 15'. The compartment 9 has also been removed and the fairing 11 moved forward and secured to the wall 8 of the cabin 2 and to the bottom sides of the beams 5. In order that the fairing change noted between Figs. 2 and 3 may be readily accomplished wing nuts 16 and 17 are provided. A detachable fin panel 18 is also provided to fill the gap in the tail surfaces 6 made by removal of the rearward portion of the fairing 11 to the position shown in Fig. 3.

Fig. 4 shows the compartment 9 in cross-section, looking aft. The upper extremities of the straps 10 are seen to terminate in hoisting eyes 19. The eyes 19 are connected to cable drums 20 by means of cables 21 and hooks 22. The drums 20 are fixed to the drive shaft 23, which shaft is also provided with a ratchet 24 and cranking handle 25. Access to the handle 25 is provided by means of sliding panel 7b installed in the top surface of the wing 1.

Fig. 5 shows the manner in which the fairing 11 is secured to the bottom sills of the beams 5.

Fig. 6 is a side elevation of a modified form of vehicle compartment. The vehicle compartment 9 is best suited to the transportation of freight, either solid or liquid. The vehicle compartment 26 is designed for passenger transportation and requires a somewhat larger (i. e., longer) airplane than that shown in Figs. 1 through 3. Retaining straps 27 support the compartment 26 in the vicinity of its two extremities, which extremities are provided at their bottom portion with castors 28. The compartment 26 is provided with a conventional door 29 and windows 30.

Fig. 7 shows a cross-section through the compartment 26, in which a floor 31 provides support for seats 32. The hoisting eyes 19 are also shown in end profile. It is readily apparent that the compartment 26 may be trundled to and from the airplane transporting same without disturbing the passengers therewithin. It is equally obvious that any desired multiple of compartment 26 may be carried simultaneously, depending upon the size and character of the aircraft transporting the same.

Fig. 8 is a side elevation of a further modified form of vehicle compartment. The vehicle compartment 33 is adapted to the carrying of crated freight such as aircraft engines or other accessories, and is provided with hoisting eyes 19, retaining straps 27, flanges 34 and bolt assemblies 35. The last two named parts are utilized to lock the two halves of the compartment 33 together, at the warehouse, while the castors 28 are utilized to trundle the assembled compartment to and from the aircraft transporting the same.

Fig. 9 shows a cross-section through the compartment 33, in which a divided floor 31' provides support for a crate 36.

Fig. 10 shows application of my invention to the "square" type of fuselage construction. Forward of aft wall 37 of cabin 38, the airplane illustrated is substantially similar to the airplane shown in Figs. 2 and 3. Aft of the wall 37, the beams 5 of Figs. 1 through 3 have been replaced with longitudinal load carrying structure 39, i. e., structure designed to carry tail loads. The side walls of fuselage 40 have been extended downwardly such that continuous fairing is provided from aft wall 41 of vehicle compartment 42 to the bottom-most portion of tail surfaces 43. When compartment 42 is lowered to the ground, a laterally extending recess is formed below the bottom-most portion of the structure 39, between the limits of the aft wall 37 and forward wall 47 (shown in Fig. 11). It is of course obvious that the compartment 42 may be divided into two or more independent compartments, as commercial usage may require. It is further obvious that the supporting structure of a rigid or semi-rigid airship may be utilized in a manner similar to the longitudinal load carrying structure 39 of Fig. 10 for retention of the compartment 42 and fairing similar to that provided by the side walls of the fuselage 40.

In Fig. 11 a cover 44 is provided for closing the laterally extending recess formed by removal of the compartment 42. Cover retainers 45 and 46 are provided upon the fore and aft walls of the cover 44 for securing the same to aft wall 37 and forward wall 47 of the fuselage 40, respectively.

In Fig. 12, the aft wall 37 is provided with a plurality of cylindrical housings 48. The stem of an L-shaped rod 49 is slidably secured to each housing 48. The washer 50 is fixed to the aforesaid stem mid-way of housing ends such that both sides of the aforesaid washer are "backed" by springs 51. The L end of the rod 49 is provided with a button 52, a portion of which has been broken away to show a cross-section of the rod 49. The forward end of the cover 44 is provided with a plurality of plates 53, having a hole 54 and slot 55. When the aforesaid end is contacted with the aft wall 37, the button 52 may be readily inserted through the hole 54, whereupon forward movement of the cover 44 locks the L portion of the rod 49 within the slot 55, the under side of the button 52 resting against the outer surface of the plate 53. It is obvious that considerable widening or contracting of the "gap" between the aft wall 37 and the forward portion of the cover 44 induced by structural weaving during flight may take place without injury or disengagement of the cover retainers 45.

In Fig. 13, the forward wall 47 of the fuselage 40 is provided with a plurality of cylindrical housings 56. The stem of an L-shaped rod 57 is slidably secured to each housing 56. A washer 58 is fixed to the aforesaid stem mid-way of housing ends such that both sides of the aforesaid washer are "backed" by springs 59. The L end of the rod 57 is provided with a button 52, a portion of which is broken away to show a cross-section of the rod 57. The aft wall of the cover 44 is provided with a plurality of plates 60, having a hole 61 adapted to permit passage of the button 32. A catch 62 is pivotally secured to the plate 61 by means of a screw 63 and is provided with an angularly disposed slot 64. It is further obvious, as stated above, that structural weaving during flight will not effect injury or disengagement of the cover retainers 46.

Figs. 14 and 15 show the side and end elevations of a longitudinally disposed drive shaft 65 and drums 20. The drums 20 are provided with cables 21 and hooks 22 adapted to engage eye plates 66 fixedly secured to the compartment 42. In Fig. 15 is shown the end profile of one of a plurality of longitudinally disposed beams forming the "backbone" of the tail load carrying structure 39. A sill 67 is provided for supporting bearing blocks 68 of the drive shaft 65 and for further safetying the eye plates 66 by insertion of bolts 69 after the compartment 42 has positioned as shown in Figs. 14 and 15.

I claim:

1. In an airplane having the forward portion of a fixed streamline fairing disposed at the forward end of the longitudinal load carrying structure of its body, a longitudinally movable fairing depending from the rear end of the load carrying structure and adapted to be arranged with respect to said fixed fairing such that a predetermined portion of the undersurface of said load carrying structure is left unobstructed between the adjacent walls of said fairings and one or more detachable compartments adapted to completely fill said unobstructed space between the adjacent walls of said fairings and to form therewith substantially one continuous fairing.

2. In an airplane having the forward portion of a fixed streamline fairing disposed at the forward end of the longitudinal load carrying structure of its body, a longitudinally movable fairing depending from the rear end of the load carrying structure and adapted to be arranged with respect to said fixed fairing such that a predetermined portion of the undersurface of said load carrying structure is left unobstructed between the adjacent walls of said fairings, one or more detachable compartments adapted to completely fill said unobstructed space between the adjacent walls of said fairings and to form therewith substantially one continuous fairing, and means secured to said load carrying structure for unlatching and lowering said compartment or compartments to the ground.

3. In an airplane having the forward portion of a fixed streamline fairing disposed at the forward end of the longitudinal load carrying structure of its body, a longitudinally movable fairing depending from the rear end of the load carrying structure and adapted to be arranged with respect to said fixed fairing such that a predetermined portion of the undersurface of said load carrying structure is left unobstructed between the adjacent walls of said fairings, one or more detachable compartments adapted to completely fill said unobstructed space between the adjacent walls of said fairings and to form therewith substantially one continuous fairing, means secured to said load carrying structure for unlatching and lowering said compartment or compartments to the ground, and means attached to the rear of said airplane body for raising and temporarily securing the longitudinal axis of said body in true horizontal, then lowering the same into normal taxiing attitude.

4. In an airplane having a fixed streamline fairing depending from the forward end of the shallow longitudinal load carrying structure of its body, a second fairing depending from said load carrying structure and adjustable with respect to but not overlapping in extreme rearward position the aforesaid structure, and means for longitudinally varyingly adjusting said second fairing with respect to said first fairing such that in at least one position the combined fairings form substantially one continuous fairing.

5. In an airplane having a fixed streamline fairing depending from the forward end of the shallow longitudinal load carrying structure of its body, one or more compartments depending from said structure in streamline continuation of said fairing and adapted for ready lowering from said structure, and a second fairing carried by said load carrying structure and adjustable with respect to said first fairing such that in at least one position the combined fairings form substantially one continuous fairing.

HUGH J. KNERR.